United States Patent [19]
Brooks et al.

[11] Patent Number: 5,082,605
[45] Date of Patent: Jan. 21, 1992

[54] METHOD FOR MAKING COMPOSITE MATERIAL

[75] Inventors: Joe G. Brooks, Springdale; Billy D. Goforth, Fayetteville; Charles L. Goforth, Lowell, all of Ark.

[73] Assignee: Advanced Environmental Recycling Technologies, Inc., Springdale, Ark.

[21] Appl. No.: 530,840

[22] Filed: May 30, 1990

Related U.S. Application Data

[63] Continuation-in-part of Ser. No. 491,061, Mar. 14, 1990.

[51] Int. Cl.$^5$ .................. B29C 47/02; B29C 47/92
[52] U.S. Cl. ........................... 264/40.6; 264/118; 264/119; 264/122; 264/108; 264/174; 264/176.1; 264/211.12; 264/349; 264/237; 264/348
[58] Field of Search ............. 264/108, 109, 117, 118, 264/122, 40.1, 176.1, 174, 177.1, 349, 348, 40.6, 119, 211.12, 237; 425/311, 297, 142, 377

[56] References Cited

U.S. PATENT DOCUMENTS

| | | | |
|---|---|---|---|
| 3,245,867 | 4/1966 | Clarke. | |
| 3,359,350 | 12/1967 | Godfrey | 264/108 |
| 3,554,856 | 1/1971 | Opferkuch et al. | |
| 3,578,523 | 5/1971 | Ohse | 156/164 |
| 3,836,412 | 9/1974 | Boustany et al. | 156/62.2 |
| 3,956,541 | 5/1976 | Pringle | 428/2 |
| 3,995,003 | 11/1976 | Potter et al. | 264/122 |
| 4,225,640 | 9/1980 | Erb | 428/2 |
| 4,228,116 | 10/1980 | Colombo et al. | 264/119 |
| 4,248,743 | 2/1981 | Goettler. | |
| 4,376,144 | 3/1983 | Goettler | 428/36 |
| 4,479,912 | 10/1984 | Bullock | 264/23 |
| 4,791,020 | 12/1988 | Kokta | 428/326 |
| 4,938,605 | 7/1990 | Friedrich | 425/311 |

OTHER PUBLICATIONS

"Use of Eastern Hardwoods in Wood Fiber/Plastic Composites", Selke, et al., Michigan State University (1988).
"Compounding Wood Fibers and Recycled High Density Polyethylene Using a Twin-Screw Extruder", Selke et al., Michigan State University (1988).
"Uses of Recycled Plastics in Composite Materials", Yam, Michigan State University (Date Unkown).

*Primary Examiner*—Jeffery Thurlow
*Assistant Examiner*—Mathieu Vargot
*Attorney, Agent, or Firm*—Ross, Howison, Clapp & Korn

[57] ABSTRACT

A method for making a composite material including a discontinuous phase of cellulosic fiber encapsulated in and bonded to a continuous phase of a polymeric component containing a major portion of polyethylene by mixing the cellulosic fiber and polymeric component while raising the temperature of the mixture to the encapsulation point, maintaining the encapsulated material within the encapsulation range while reducing the particle size, and thereafter extruding the material while controlling its temperature within the encapsulation range and substantially aligning the fibers in the flow direction until the material contacts a heated die.

20 Claims, 1 Drawing Sheet 5,082,605

METHOD FOR MAKING COMPOSITE MATERIAL

CROSS-REFERENCE TO RELATED APPLICATION

This application is a continuation-in-part of U.S. application Ser. No. 07/491,061, filed Mar. 14, 1990, the full text of which is incorporated by reference herein.

TECHNICAL FIELD

This invention relates to an improved method for making composite materials comprising a discontinuous phase of cellulosic fiber encapsulated in a polymeric matrix. More particularly, this invention relates to a method for making extruded composites comprising discontinuous wood fibers encapsulted and substantially aligned in a continuous polymeric phase consisting primarily of polyethylene.

BACKGROUND OF THE INVENTION

The encapsulation of cellulosic fibers in a polymeric matrix is known, having previously been disclosed for example in U.S. Pat. Nos. 3,836,412; 4,228,116; 4,248,743; 4,376,144; and 4,792,020.

U.S. Pat. No. 3,836,412 discloses composites of discontinuous organic fiber bonded in a vulcanized elastomer.

U.S. Pat. No. 4,228,116 discloses a process for producing remoldable panels by continuously plastifying and extruding an at least partially aggregated mixture comprising about 40 to about 60 weight percent cellulosic filler, and rolling the web of extruded material prior to its solidification.

U.S. Pat. No. 4,248,743 discloses dispersing wet wood pulp in a mixture of polyethylene, carbon black and ethylene vinyl acetate rubber in a Brabender mixer. The amount of fiber added ranged from 10.3 to 15.9 parts by weight fiber per 100 parts of the sum of polyethylene and rubber.

U.S. Pat. No. 4,376,144 dislcoses treating cellulose fibers with vinyl chloride polymer, a plasticizer and an isocyanate bonding agent to produce moldable or extrudable composites.

U.S. Pat. No. 4,791,020 discloses composites comprising wood fiber dispersed in and bonded to a mixture of polyethylene (or a copolymer of ethylene and propylene) and a compound containing at least one isocyanate group made by processing the mixture in an internal mixer or extruder, or on a roll mill.

In papers titled "Use of Eastern Hardwoods in Wood Fiber/Plastic Composites" and "Compounding Wood Fibers and Recycled High Density Polyethylene Using a Twin-Screw Extruder", Michigan State University (1988), researchers reported composites made by mixing up to 60 weight percent wood fibers into a high density polyethylene matrix in a twin-screw extruder. Use of a double planetary mixer equipped with a hot oil bath was not able to provide adequate melting of the HDPE and resulted in excessive charring and degradation of wood fiber. Mixing in a single-screw extruder only worked well for fiber levels up to about 10 percent by weight.

Notwithstanding the processes previously disclosed by others, there remains a need for a method of producing strong composite materials comprising cellulosic fibers dispersed in a polyolefinic matrix without requiring the use of vulcanizable elastomers, vinyl chloride polymer, or isocyanate bonding compounds.

SUMMARY OF THE INVENTION

According to the present invention, it has now been discovered that by identifying and classifying raw materials and by controlling process parameters as disclosed herein, extruded composite products can be produced which exhibit excellent fiber encapsulation and related physical properties without relying on special lubricants, plasticizers or bonding agents. The composite products made by the method of the invention preferably comprise a discontinuous phase of cellulosic fibers encapsulated in a contious polymeric phase preferably comprising polyethylene, and optionally, from about 10 to about 15 weight percent polypropylene.

The composite materials produced according to the method disclosed herein are useful for making synthetic wood products such as building materials (roof shingles, siding, floor tiles, paneling, moldings, structural components, steps, door and window sills and sashes); house and garden items (planters, flower pots, landscape tiles, decking, outdoor furniture, fencing and playground equipment); farm and ranch items (pasture fencing, posts, barn components); and marine items (decking, bulkheads, pilings), etc.

According to one preferred embodiment of the invention, the cellulosic fiber and polymeric materials are preferably combined and mixed in a ratio ranging from about 40 weight percent polymer and 60 weight percent fiber to about 60 weight percent polymer and 40 weight percent fiber until the surface temperature of the mixture is between about 290 and about 350 degrees F. or higher, depending upon the type of polymeric material used. The mixture is then preferably subdivided into particles having a maximum dimension of about 1.5 inches and subsequently extruded while maintaining the stock temperature within the encapsulation temperature range. During extrusion, the encapsulated fibers are substantially aligned in the flow direction. As the extrudate passes through the die, the surface temperature is preferably elevated to improve surface properties. After exiting the extruder, rollers are preferably used to maintain dimensional stability of the extrudate until the surface temperature of the extrudate decreases to about 140 degrees F. and the core temperature decreases to about 180 degrees F. or less.

BRIEF DESCRIPTION OF THE DRAWING

The method of the invention is further described and explained in relation to the following drawings wherein.

DESCRIPTION OF THE PREFERRED EMBODIMENTS

Figure 1:
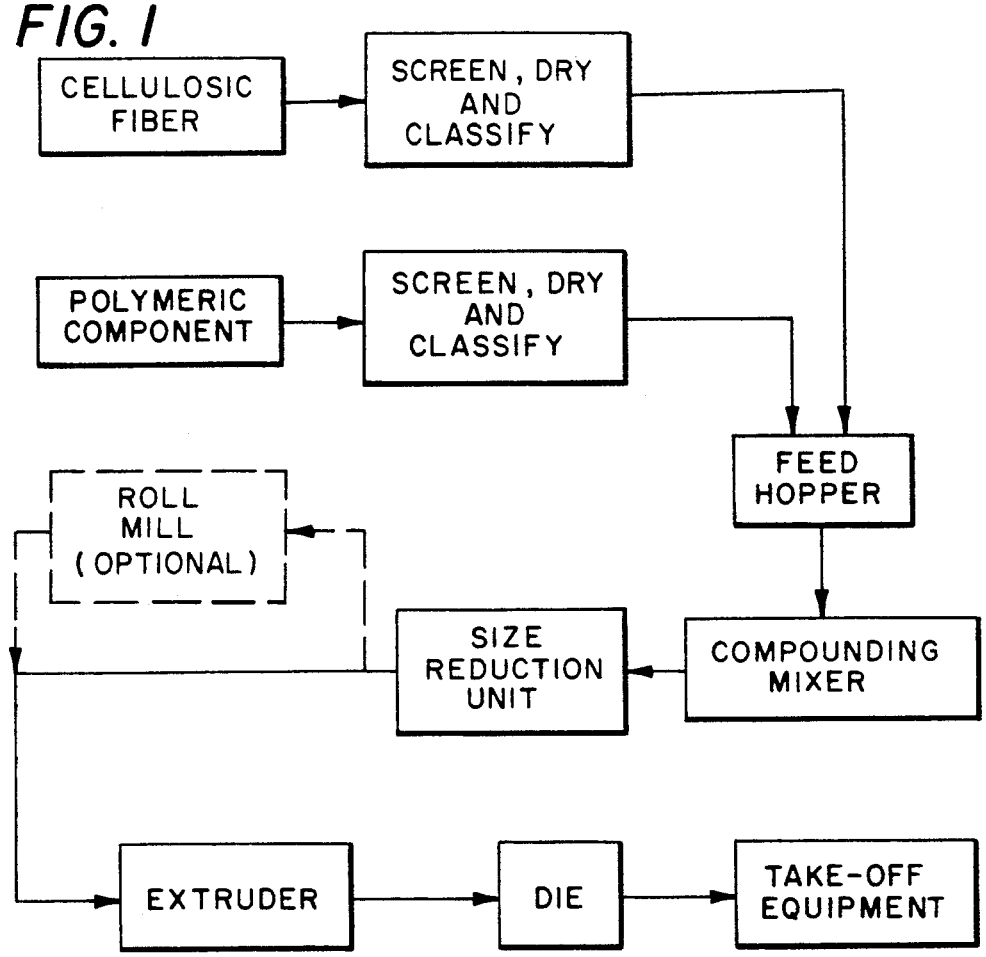
FIG. 1 depicts in simplified diagrammatic form a preferred embodiment of the method of the invention.

Referring to FIG. 1, the preferred principal materials for use in the method of the invention are wood fiber and polyolefins. Although many types and sources of wood or other cellulosic fiber and mixtures thereof are available and can be used within the process of the invention, a preferred wood fiber for use in the present invention is juniper or cedar fiber, and most preferably, *Juniper Mexicana,* popularly known as Texas cedar.

Cedar fiber is presently available as a waste product from cedar oil mills. However, because the raw waste from cedar oil mills usually includes relatively large chunks of wood as well as tramp materials such as rocks, metal and the like, the cedar fiber is desirably decontaminated and classified by the use of conventional equipment such as screens, shakers, separators and magnets prior to storing it in holding bins or silos pending use in the subject process.

According to a preferred embodiment of the invention, all tramp materials and wood particles over $\frac{1}{8}$ inch in width or diameter are removed from the wood fiber, and the wood fiber is further classified by length and diameter or by aspect ratio. Additional grinding may be required to reduce the particle size distribution of the wood fiber material to acceptable ranges. The wood fiber material preferred for use in the method of the invention consists mainly of splinters or slivers having a width or diameter less than about $\frac{1}{8}$ inch and a length ranging from about 2 to about 12 times the width or diameter. Wood fibers having a width or diameter of about 1/16 inch and a length of about $\frac{3}{8}$ inch are particularly preferred. Such splinters or slivers are likely to be irregularly shaped with jagged ends and/or edges.

Because of the hygroscopic nature of cellulosic fibers, drying is usually required. For use in the method of the invention, the moisture content of the wood fiber will preferably be less than about 15 percent, and most preferably, less than about 8 percent by weight. Excessive moisture in the wood fiber can impede bonding between the wood fiber and polymeric material, increase the required processing time, and cause pitting or bubbling in the finished product. A conventional, variable speed, tunnel drier fueled by waste wood chips or other fuel can be used to reduce the moisture content of the cedar fibers. It is also believed that microwave technology can be used to flash off moisture if desired.

The polymeric material utilized in the method of the invention preferably comprises a major portion of at least one polyolefin, with polyethylene being particularly preferred. The source and type of polyethylene used in the subject method can vary widely and can include, for example, both high density (HDPE) and low density (LDPE) materials. Numerous sources of waste HDPE and LDPE are available. Preferred sources of polyethylene include recycled materials such as, for example, off-spec resin from manufacturers, as well as rejects, scrap and post-consumer and industrial waste from containers for milk, distilled water, fruit juices, soft drink concentrates, liquid detergents, bleach, and the like, floor sweepings, and plastic coating waste from hydropulpers that has been processed to reduce its fiber content to less than about 10 percent by weight.

The polymeric material is preferably identified, screened, cleaned, dried and classified prior to storage. If not already in granular, flake or pellet form, the material is desirably ground to a maximum particle dimension not exceeding about $\frac{1}{4}$ inch. When prepared for use in the process of the invention, the moisture content of the polymeric material is preferably less than about 6 percent by weight, and most preferably, only trace amounts of moisture will remain. The cleaned and dried plastic feed material is preferably classified as to resin type and physical properties (such as melt flow and viscosity ranges), and stored in various holding bins pending further processing.

Although polyethylene is a preferred polymeric material for use in producing the fiber-encapsulated composite materials as disclosed herein, other polyolefinic and polymeric materials can also be used in the method of the invention subject to the considerations discussed in more detail below. Other plastics which can be used within the scope of the invention include those which can be processed with extrusion equipment at temperatures that do not adversely affect the wood fiber feed component (such as by charring or the like) so as to produce an unacceptable product.

According to one particularly preferred embodiment of the invention, a mixture of polyethylene and from about 10 to about 15 weight percent polypropylene is used as the polymeric component in the subject method. The percentage of polypropylene used will desirably depend upon the viscosity and melt index of the polyethylene, with less polypropylene being used where a major portion of the polyethylene is high density rather than low density. In general, increasing the amount of polypropylene within the preferred ranges will improve the physical properties of the resultant composite material.

From about 40 to about 60 weight percent wood fiber and from about 60 to about 40 weight percent plastic prepared and selected as discussed above are preferably metered into a scale pit and then conveyed by means such as a bucket elevator into an overhead holding bin, or else directly into the feed hopper of a compounding machine. It should be understood that the relative percentage of wood to plastic preferred for use in a particular application can vary, and will depend upon factors such as the type, size and moisture content of the wood fiber; the type, size and physical properties of the plastic material being utilized; and the physical properties desired in the composite material being produced by the process. According to a preferred embodiment of the invention, batch size will range from about 1000 to about 1200 pounds, considering the combined weights of the fiber and plastic feed materials, although it is understood that other batch sizes may be more appropriate, depending upon the size of the processing equipment.

A satisfactory compounding machine for use in the present invention is an insulated, hot-oil jacketed, sigma blade, double arm mixer modified by the addition of means such as an infrared sensor to permit monitoring of the working stock temperature of the mixture.

According to a preferred embodiment of the invention, the temperature of the hot oil circulated through the jacket of the compounding machine can be selected within a range between about 300 and about 600 degrees F. A hot oil set point of about 450 degrees F. is satisfactory for use in making the preferred compositions disclosed herein. The mixer blades are preferably variable speed, and are rotated at approximately 30 revolutions per minute. Mixing continues for so long as is needed to raise the stock temperature of the mixture to the encapsulation point, usually between about 290 and about 350 degrees F. It has been discovered that whenever wood fiber and plastic comprising a major portion of polyethylene are mixed under these conditions, the wood fibers will disperse into and be encapsulated within a continous phase of the plastic material, and will bond to the plastic. As used herein, the term "encapsulation point" means the lowest stock or mixture temperature at which thorough dispersion, encapsulation and bonding of the cellulosic fiber within the polymeric matrix are achieved. The encapsulation point will generally be at a temperature above the softening point of the polymeric material, and will fall within the encapsulation range. It is understood, however, that the preferred encapsulation range can extend upward to the temperature where thermal degradation of the polymer or wood fiber component begins to occur.

As used herein, the term "encapsulation range" refers to the temperature range at which the fiber/plastic mixture can be processed and extruded, and the preferred encapsulation range will normally bracket the encapsulation temperature by about plus or minus 20 degrees F. By way of example, for mixtures comprising about 55 weight percent cedar fiber and about 45 weight percent LDPE, the encapsulation range is preferably from about 280 degrees F. to about 320 degrees F. For composite material comprising about 55 weight percent fiber and about 45 weight percent of a mixture further comprising about 60 weight percent LDPE and about 40 weight percent HDPE, the encapsulation range is preferably from about 320 degrees F. to about 360 degrees F.

Although the time required to reach the encapsulation point will necessarily vary according to factors such as the type and amount of fiber and plastic utilized, moisture content of the feed materials, feed temperature, relative humidity, mixing speed, and the temperature of the hot oil, it is believed that mixing times ranging from about 30 minutes to about 75 minutes are sufficient to achieve thorough mixing and encapsulation under the range of process conditions disclosed herein.

Figure 2:
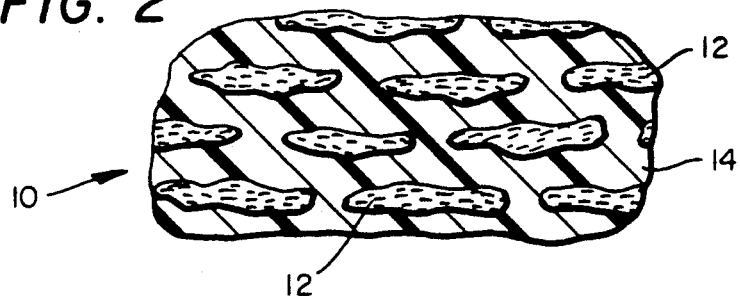
FIG. 2 depicts an enlarged detail view of a section of an extruded composite material comprising substantially aligned wood fibers dispersed in a continuous polymeric matrix in accordance with the method of the invention.
Figure 3:
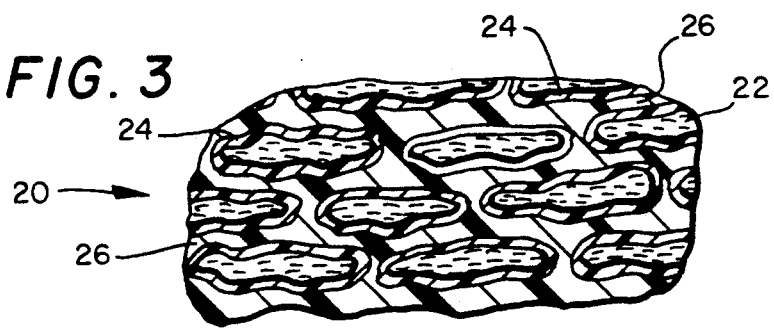
FIG. 3 depicts an enlarged detail view of a section of an extruded composite material comprising substantially aligned wood fibers believed to be individually encapsulated within a thin resole layer and dispersed throughout a continuous polymeric matrix in accordance with another embodiment of the method of the invention.

The process of the invention yields a composite product 10 comprising a plurality of wood fibers 12 dispersed throughout a continuous phase of polymeric material 14 as shown in FIG. 2, which is an enlarged detail view of a portion of the encapsulated material following extrusion. Although the mechanism by which encapsulation occurs is not fully understood, it is further believed that naturally occurring resins and oils released from the wood fibers during mixing may react or combine with the polymeric material near the surface of the wood fibers to produce a boundary layer of resole or phenolic-aldehyde material that individually encapsulates the wood fibers dispersed throughout the continuous polymeric phase. FIG. 3, another enlarged detail view of a portion of the encapsulated material following extrusion, depicts composite product 20 comprising wood fibers 22 each surrounded by a phenolic boundary layer 24 and dispersed throughout a continuous phase of polymeric material 26 as previously disclosed.

Following encapsulation, the bonded fiber/plastic mixture has a clumpy, doughy consistency and is desirably transferred to the feed hopper of a size reduction unit comprising counter-rotating shafts with intermeshing, radially extending members adapted to break the mixture into smaller-sized pieces. The feed hopper of the size reduction unit is desirably heated by conventional means so as to maintain the temperature of the mixture within the encapsulation range. In the size reduction unit, the clumps of encapsulated material are desirably reduced to particles having a maximum dimension of about 1 ½ inches or less. Larger clumps can cause surging when the material is later fed to an extruder, and can make it more difficult to control the orientation of the wood fibers within the extruded composite.

Following size reduction, the encapsulated mixture can be run through a conventional roll mill if desired to incorporate other additives such as fire retardants, ultraviolet stabilizers, catalysts, and the like, which are likely to be degraded if subjected to prolonged mixing in the compounding machine.

According to a preferred embodiment of the invention, the encapsulated mixture is then fed to an extruder modified for extruding fiber/plastic composites. A satisfactory extruder for use in extruding batches of the encapsulated mixtures as disclosed herein in accordance with the method of the invention is a compounding extruder having a screw with a feed section that is preferably about 12 inches in diameter and from about 12 to about 30 inches long. The feed section of the screw preferably tapers at approximately a 45 degree angle to a compression section having a diameter of about 6 inches and a length of from about 30 to about 36 inches. In the feed section, the flights of the extruder screw are preferably spaced about 10 inches apart, have a thickness of about ¾ inch, and a depth of about 3 inches. In the compression section, the flights of the extruder screw are preferably spaced about 5 inches apart, have a thickness of about ¾ inch, and a depth of about 1 inch. The extruder screw will preferably be rotatable at various speeds, and the preferred rotational speed will depend upon factors such as the desired throughput, the nature and properties of the feed material, the configuration of the extrudate, desired surface properties, and the like.

In accordance with the method of the invention, the temperature of the encapsulated fiber/plastic mixture is preferably maintained within the encapsulation range from the time the encapsulation temperature is first reached in the compounding machine until the extrudate passes through the extruder die. It is therefore desirable that means be provided to dissipate the heat that may otherwise build up in the compression section of the extruder due to the mechanical work done on the mixture by the rotating screw.

According to a preferred embodiment of the invention, the compression section of the extruder is jacketed and a cooling medium is circulated through the jacket to maintain the temperature of the encapsulated mixture within the encapsulation range. If the temperature of the encapsulated mixture is permitted to drop significantly below the encapsulation range, the material will not flow properly, thereby increasing the mechanical energy required to work the material, and causing irregularities in the resultant extrudate. On the other hand, if the temperature of the encapsulated mixture significantly exceeds the maximum temperature of the encapsulation range, the extrudate will not be dimensionally stable, and polymer degradation, charring of the wood fiber, or autoignition can occur. By way of example, a mixture of 55 weight percent cedar fiber and 45 weight percent LDPE should not be allowed to reach a temperature greater than about 450 degrees F. except for slight exposure of the surface to a higher temperature as discussed below while passing through the die. Similarly, except for the surface temperature while passing through the die, a mixture of 55 weight percent cedar fiber encapsulated in 45 weight percent of plastic in turn comprising about 60 weight percent LDPE and about 40 weight percent HDPE should not be allowed to reach a temperature greater than approximately 500 degrees F.

The extruder screw will desirably form the particles of encapsulated mixture into a homogeneous mass which is then preferably forced through a fiber alignment plate or other similarly effective means prior to reaching the extruder die. The primary functions of the fiber alignment plate are to disrupt any spiralling motion imparted to the material by the extruder screw, to avoid channeling and help balance the flow of material to the die as needed for extruding a desired profile, and to help align the encapsulated fibers within the material in the flow direction. Fiber alignment plates useful in the method of the invention preferably comprise, a plurality of spaced-apart bars or orifices adapted to substantially align the fibers without plugging off or breaking a substantial portion of the fibers.

After passing through the fiber alignment plate, the fiber-encapsulated mixture is preferably directed through a heated die. Most preferably, the extruder will be equipped with a bolster and interchangeable dies to facilitate changing the profile of the extrudate. The die is preferably equipped with conventional electrical heating elements such as band or cartridge heaters to maintain the interior walls of the die at an elevated temperature relative to the stock temperature of the extrudate. Increasing the surface temperature of the extrudate within these ranges will improve its finish and reduce the likelihood of tearing as it exits the extruder. A preferred surface temperature range for extrudates comprising 55 weight percent cedar fiber encapsulated in 45 weight percent LDPE is from about 425 to about 450 degrees F. A preferred surface temperature range for extrudates comprising a similar mixture of cedar fiber with a plastic component comprising about 60 weight percent LDPE and about 40 weight percent HDPE is from about 460 to about 500 degrees F.

If desired, control of the extruder screw speed, jacket temperature and die temperature and pressure can all be automated by through the use of commercially available control equipment and instrumentation.

Also, if desired, an additonal surface layer comprising a different material can be coextruded onto the surface of the composite extrudate of the invention by use of a conventional crosshead die.

After exiting the extruder die, the extrudate is preferably cooled under controlled conditions to avoid deformation or stress buildup until the core temperature of the extrudate is less than about 180 degrees F. The cooling time required for a particular profile will depend upon the temperature of the material exiting the die, the geometry of the extrudate, ambient conditions, and the extent of any external cooling.

According to a preferred embodiment of the invention, the extrudate is cut into segments having a desired length and then directed along a variable speed rolling and cooling conveyor. The guides and rollers on the conveyor are preferably adapted to exert minimal pressure on the extrudate to avoid inducing any appreciable stress that can weaken or deform the finished product.

After cooling, the lengths of product are collected and assembled for storage or shipment, or for further processing such as sawing, forming, milling, finishing, painting, and the like.

Other alterations and modifications of the subject invention will become apparent to those of ordinary skill in the art upon reading the present disclosure, and it is intended that the scope of the invention be limited only by the broadest interpretation of the appended claims to which the inventors are legally entitled.

We claim:

1. A method for making an extruded dimensionally stable and water resistant composite material comprising a discontinuous phase of substantially aligned cellulosic fibers encapsulated in a polymeric continuous phase, said method comprising the steps of:
   a. Combining from about 40 to about 60 weight percent cellulosic fiber with from about 60 to about 40 weight percent of a polymeric component comprising a major portion of polyethylene;
   b. Mixing the cellulosic fiber and polymeric component while simultaneously heating a mixture thereby formed to increase the temperature of the mixture to an encapsulation point and monitoring the temperature of the mixture to determine when the temperature reaches the encapsulation point to form a mixture comprising a discontinuous phase of cellulosic fibers encapsulated in a polymeric continuous phase;
   c. Reducing the mixture to smaller particles and feeding such particles to an extruder while maintaining the temperature of the mixture and the particles produced therefrom within an encapsulation range of plus or minus about 20 degrees F. from the encapsulation point;
   d. Extruding the particles into a homogeneous mass while controlling the temperature of the homogeneous mass within the encapsulation range;
   e. Forcing the homogeneous mass through an alignment plate to substantially align the fibers in a flow direction within the polymeric continuous phase; and
   f. Directing the homogeneous mass with fibers substantially aligned in the flow direction through a die to form a composite extrudate having a desired shape.

2. The method of claim 1 wherein said cellulosic fiber comprises less than about 15 percent moisture by weight.

3. The method of claim 2 wherein said cellulosic fiber comprises less than about 8 percent moisture by weight.

4. The method of claim 1 wherein said cellulosic fiber is wood fiber.

5. The method of claim 4 wherein said wood fiber is selected from the group consisting of cedar and juniper.

6. The method of claim 1 wherein said cellulosic fiber has a width ranging from about 1/16 to about ⅛ inch.

7. The method of claim 1 wherein said cellulosic fiber has a length ranging from about 2 to about 12 times its width.

8. The method of claim 1 wherein said polymeric component comprises less than about 6 percent moisture by weight.

9. The method of claim 1 wherein said polymeric component has a maximum particle dimension of about ¼ inch.

10. The method of claim 1 wherein said polymeric component is low density polyethylene.

11. The method of claim 1 wherein said polymeric component comprises a major portion of low density polyethylene and a minor portion of high density polyethylene.

12. The method of claim 11 wherein said polymeric component comprises about 60 weight percent of low density polyethylene and about 40 weight percent of high density polyethylene.

13. The method of claim 1 wherein said polymeric component further comprises a minor portion of polypropylene.

14. The method of claim 13 wherein said polymeric component comprises from about 10 to about 15 weight percent polypropylene.

15. The method of claim 1 wherein the cellulosic fiber and polymeric component are mixed in a jacketed, double-arm, sigma blade mixer.

16. The method of claim 15 wherein the temperature of said cellulosic fiber and said polymeric component are increased during mixing by circulating hot oil through said jacket at a temperature ranging from about 300 to about 600 degrees F.

17. The method of claim 1 wherein the encapsulation point ranges from about 290 to about 350 degrees F.

18. The method of claim 1 wherein the temperature of the mixture is monitored during mixing by infrared sensing.

19. The method of claim 1 wherein the surface temperature of the extrudate ranges from about 425 degrees F. to about 450 degrees F. as it exits the die.

20. The method of claim 1 comprising the further step of cooling the extrudate to a core temperature of less than about 180 degrees F. without subjecting the extrudate to appreciable stress.

* * * * *